June 30, 1959
B. WALKER
2,892,636
AUXILIARY VEHICLE SUSPENSION INCORPORATING A COIL
SPRING MOUNTED AROUND A SHOCK ABSORBER
Filed Nov. 25, 1953
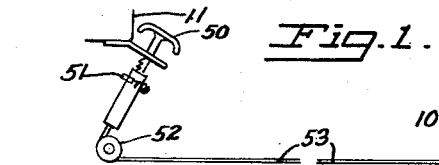
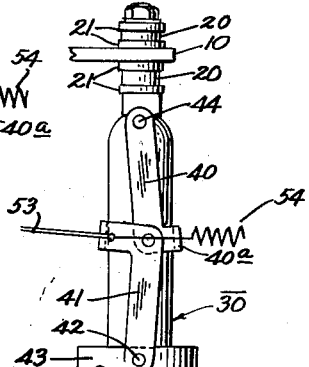
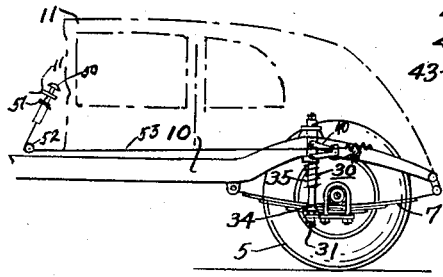
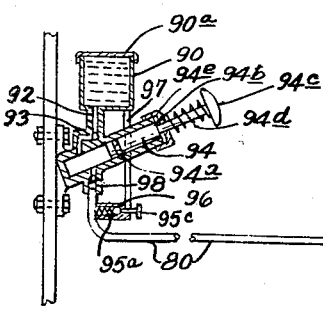
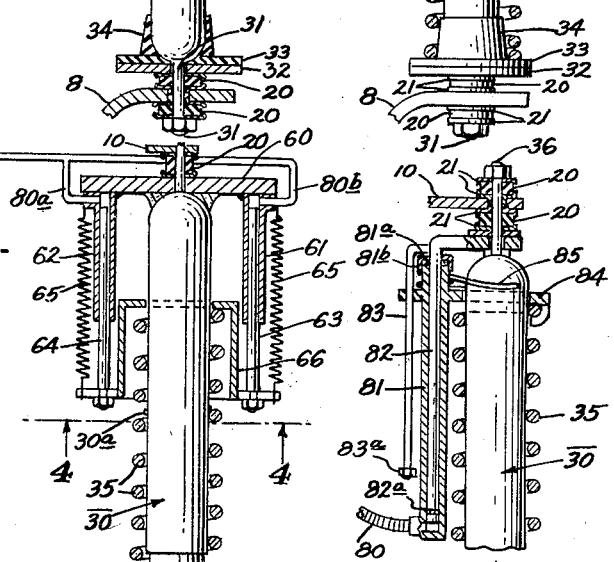
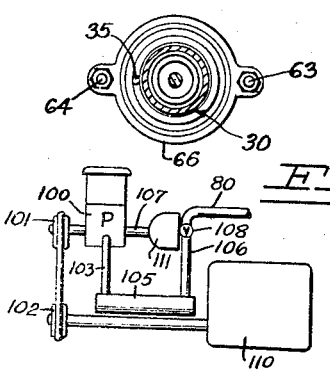
INVENTOR.
Brooks Walker United States Patent Office 2,892,636
Patented June 30, 1959

2,892,636
AUXILIARY VEHICLE SUSPENSION INCORPORATING A COIL SPRING MOUNTED AROUND A SHOCK ABSORBER

Brooks Walker, Piedmont, Calif.

Application November 25, 1953, Serial No. 394,244

16 Claims. (Cl. 280—124)

This invention pertains to a retractable type of overload spring of a general class as those covered in my issued U.S. Patent No. 2,518,733, in which the overload spring is operable from the driver's compartment.

This particular invention involves improvements in the design of an overload spring which can be readily applied to vehicles having a telescoping type of shock absorber, the upper end of which is mounted on the vehicle frame or vehicle body and the lower end is supported on the vehicle axle or wheel-supporting structure. These points of support are already provided in the vehicle design for the shock absorber and are sufficient in strength for supporting overload springs. The telescoping type of shock absorber is suitable for guiding and carrying a coil type of spring and this invention involves a design in which the coil type spring is operated from a retracted inactive position where the major portion of the spring action of the rear wheels relative to the frame and body may take place without action of the auxiliary spring or when manually engaged the auxiliary spring becomes active through the major portion of the travel of the wheel supporting structure relative to the frame in traversing rough roads. The mechanism is also such that an initial loading of this auxiliary spring may be accomplished through the manual controls after the spring has been placed in initial action.

Another feature of the invention is the mechanism by which added leverage is given to the mechanism for engaging the overload spring at the time when the load supporting position is being reached as compared with the leverage that is in effect between the manual control and the auxiliary spring engaging mechanism at the start of operation or when the auxiliary spring is being lowered into load carrying position.

Another feature of the invention is a design whereby the hydraulic control involving one or two cylinders may be applied to the existing shock absorbers without major modification to lower and preload the auxiliary coil spring riding at the exterior of the shock absorber. With two cylinders the loading on both sides of the auxiliary spring will be even and balanced. However, an offset design with one cylinder is shown wherein the action of the hydraulic cylinder acts from a point on the center line at the upper end of the shock absorber to a collar riding over the shock absorber which carries the upper end of the auxiliary coil spring.

Another feature of the invention is to provide means whereby the retractable overload spring may be held in its inactive position by a friction means or spring retraction and lowered by hydraulic means against such friction or spring retraction.

Another feature of the invention is to provide means whereby this retractable overload spring on the exterior of the shock absorber may be applied to existing shock absorbers with minimum or no changes so that it may readily be applied to cars that are already manufactured or easily to cars as they are being manufactured for standard or auxiliary equipment.

Another feature of the invention is the mechanism whereby the auxiliary springs are operated in which a direct acting foot actuated plunger provides the hydraulic pressure for lowering the cylinders and the separate foot button relieves the actuating pressure so that the hydraulic cylinders may be retracted to the inactive position.

Other features of the invention will be more particularly pointed out in the accompanying specifications nad claims.

I have illustrated my invention in the accompanying drawings as follows:

Fig. 1 is a side elevation partly cut away of one form of the invention.

Fig. 2 is a side elevation of the same invention shown in Fig. 1 but with the actuating mechanism in the load-carrying position.

Fig. 3 is a side elevation partly cut away of another form of the invention with some of the hydraulic structure shown diagrammatically.

Fig. 4 is a cross sectional view taken at sec. 4—4 of Fig. 3.

Fig. 5 is a side elevation partly cut away of a portion of the shock absorber and the mechanism for actuating the overlaod spring comprising another form of the invention.

Fig. 6 is a reduced scale side elevation of a portion of a vehicle incorporating the invention shown in Figs. 1 and 2.

Fig. 7 is a schematic view of a portion of a hydraulic system that could be used with this invention.

In all figures like numerals of reference refer to the corresponding parts.

In Figs. 1, 2, and 6 I have shown a vehicle with a frame 10, a body 11, supporting wheels 5, the springs 7 between the wheels and the frame 10 and body 11. A shock absorber 30 of the telescoping type as is generally used on many American automobiles today, has added to it an auxiliary spring 35 carried by an annular upper retainer or bearing 43. Pivots 42 on both sides of 43 carry toggle arms 41 in front and in back of the shock absorber, as viewed in Fig. 2 and Fig. 6. Upper links 40 of the shock absorber have a connecting bar 40a which rides on the upper portion of the shock absorber to prevent the toggle arms from passing the on-center position when pulled into the position shown in Fig. 2 by cable 53 passing around pulley 52 to engagement with operating handle 50 which is held in engaged position by ratchet 51 of the conventional hand-brake type. Spring 54 retracts the toggle composed of links 40 and 41 to the inactive position wherein spring 35 is raised out of contact with spring receiving stops in the form of washers 34, 33, and 32. Washers 34 and 33 are preferably of a non-metallic type so that when the lower end of spring 35 contacts these spring receiving assemblies, a minimum of noise will result. All of these spring receiving assemblies are preferably mounted on bolt 31 carried at the lower end of the shock absorber and mounting said shock absorber.

In Figs. 3 and 4 I have shown a method of lowering the auxiliary spring 35 by means of two hydraulic cylinder rods 63 and 64 mounted at opposite sides of the auxiliary spring 35 on annular spring retaining member or bearing 66. Springs 65 retract the pistons 63 and 64 to the position where auxiliary spring 35 is inactive and out of contact with the spring receiving assembly at the lower end of the shock absorber. Such assembly is mounted on bolt 31 at the lower end of the shock absorber which carries rubber sleeves 20 and washers 21 on both sides of said rubber sleeves which in turn are on opposite sides of spring support plate 8 or other suitable member attached to the vehicle supporting structure. As an actuating means for energizing said pistons 63 and 64 to lower the auxiliary spring 35 the engine oil pressure may be used or the power steering pressure may be used as shown in Fig. 7 where engine 110 drives pulley 102 to drive power steering pump 100. Outlet line 107 connects to valve body 111 having valve 108 for controlling fluid flow to line 80 leading to cylinders 61 and 62, Fig. 3 or 81 of Fig. 5. Line 106 goes from valve body 111 to power steering 105 and back to the pump through line 103. With valve 108 in the top position, line 80 is closed to hold an overload. With valve 108 in the lower position, line 80 is open to flow through power steering to pump 100 to release the overload springs. Pistons 63 and 64 may be operated by a firewall mounted pump, as shown in Fig. 3, in which a reservoir 90 has a cover 90a, a passage 92 leading past a check valve 93 that allows oil to flow from the reservoir into the pump chamber. Plunger 94 constitutes the pump plunger. It has a step 94b, a retaining collar 94e, a retracting spring 94d, and a pedal 94c. An O-ring or other suitable seal 94a prevents leakage past the plunger 94. Check valve 98 leads from the pump chamber to line 80 which is connected to each of the auxiliary spring lowering cylinders 62 and 61 by lines 80a and 80b respectively. As a means of retracting the overload spring, the action of retracting spring 65 causes oil to flow through line 80 and back to the reservoir when plunger pedal 95c is pressed against check valve 96 and spring 95a to unseat the combined relief and check valve 96 allowing oil to flow directly back to the reservoir through line 97 bypassing the pump. Suitable pairs of cylinders would be installed on the other shock absorber for the other rear wheel to get suitable auxiliary spring action on each of the rear shock absorber assemblies. Stops 30a may be formed in the shock absorber body to intercept the spring guide 66 to limit the lowermost action of the hydraulic cylinders 62 and 61 or other suitable stops may be used. Also, dust protecting shields or guards may be added to the cylinder. Cylinders 61 and 62 are mounted on plate 60.

In Fig. 5 is shown an alternate construction in which an offset cylinder 81 is secured to a collar 84 which retains the upper end of auxiliary spring 35 and rides on shock absorber 30. A piston rod 82 is fitted to cylinder 81 and sealed by O-ring 82a or other suitable means and is formed at its upper end into a right angle and a washer to ride on bolt 36. Bolt 36 extends from the upper end of the shock absorber between rubber bushing 20 and its associated cupped washers 21 and the upper end of the shock absorber and below the frame bracket 10 to which the upper end of the shock absorber is mounted. Stop 83 is welded or otherwise suitably secured to piston rod 82. The action of the hydraulic pressure coming through line 80 is to force plunger 82 out of cylinder 81, but since 82 is essentially fastened to the frame of the vehicle cylinder 81 is lowered by hydraulic pressure and carries with it auxiliary spring 35 which is lowered into contact with the spring receiving assembly at the bottom of the shock absorber as shown in Figs. 1, 2, and 3. After the spring contacts the lower spring receiving assembly additional motion of the hydraulic cylinder 81 preloads the spring to an amount determined by the position of the stop nut 83a. The retaining spring 85 includes one or more coils around the upper end of cylinder 81 for location and the ends extend on each side of the upper portion of the shock absorber that guides carrier 84 to grip the shock absorber to hold the spring 35, cylinder 81, and associated parts in a raised inactive position when raised by a bump when hydraulic pressure in line 80 is released. Spring 81 is retained in position by cap 81b which also retains dust guard felt 81a. The two ends of spring 85 press firmly together on the upper exterior of shock absorber body 30 to hold the auxiliary spring 35 and its carrier 84 and cylinder 81 in any position where it may be forced. When line 80 is opened to the reservoir for making the auxiliary spring 35 inactive, any bump encountered will force the spring 35 and spring carrier 84 and operating cylinder 81 up to the inactive position as shown in Fig. 5 and retain it there. The action of the hydraulic pressure coming through line 80 will be to lower the assembly and auxiliary spring 35 to its active load carrying or preloaded position.

From the foregoing it can be seen that I have provided a novel construction wherein an auxiliary spring can be mounted on a conventional telescoping type of shock absorber and that said auxiliary spring may be lowered into load carrying position by a manually controlled cable from the driver's compartment or from hydraulic control source. The mounting of the auxiliary springs is exceedingly simple as it goes on to existing shock absorbers which have suitable mounts at their upper and lower ends which are relatively squeak-free and a minimum of mounting troubles are involved. An overload spring has been provided in which the retention in its inactive position is obtained by friction means and it is forced into inactive position by the depression of the rear springs in ordinary road action thereby eliminating other retracting means which may be more complicated and expensive.

Other features of the invention will be more particularly pointed out in the accompanying claims.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim as my invention:

1. A vehicle having a body, a telescoping type of shock absorber mounted through resilient means at its upper end to said vehicle body, ground engaging wheels, a structure for supporting said wheels, a resilient means forming the connection between the lower end of said shock absorber and said structure, a single cylinder mounted at the upper end of said shock absorber, a coil spring mounted around said shock absorber, said single cylinder being at one side of said coil spring, a piston for said cylinder attached to the upper center of said shock absorber, fluid pressure for operating said cylinder, said cylinder being attached to said coil spring, said cylinder being capable of lowering said coil spring into load carrying position and applying a preload to said spring after reaching the load carrying position, when said structure and said body are in their normal stationary unloaded relationship.

2. In a vehicle having a body, ground-engaging wheels, a structure for supporting said wheels, a telescoping type of shock absorber with a first portion mounted through first resilient means at its upper end to said vehicle body and through secured resilient means at its lower end of a second portion to said structure, the combination therewith of: a coil spring mounted around said shock absorber; an annular member slidably mounted around one portion of said shock absorber with one end of said coil spring secured thereto; means for moving said annular member relatively to said shock absorber to move the opposite end of said coil spring between an operative position engaging a stop means at the end of the other portion of said shock absorber so that load is applied to said spring and an inoperative position out of engagement with the last-mentioned resilient means, said annular member supporting the weight of said spring when said spring is in said inoperative position, so that it moves with said one portion of said shock absorber, independently of the other portion of said shock absorber.

3. The combination of claim 2 wherein said means for moving said annular member comprise a toggle having a first link pivotally secured at one end to said annular member, a second link pivotally secured at one end to the other end of said first link and at its other end to the center of one end of said shock absorber, and cable means secured to one said link adjacent the juncture of said first and second links for straightening out and closing up said toggle.

4. The combination of claim 2 wherein said means comprises cylinder means mounted at one end of said shock absorber, piston means in said cylinder, and fluid pressure means for operating said cylinder to move said piston means relatively to said cylinder means, one of said two latter means being connected rigidly to said shock absorber and the other being connected rigidly to said annular member.

5. The combination of claim 2 wherein said means comprises a pair of cylinders symmetrically and rigidly mounted to the upper center of said shock absorber, a pair of pistons each movable in one of said cylinders, said pistons being connected rigidly to said annular member, spring means normally urging said pistons up so as to hold said coil spring in inoperative position, and fluid pressure means connected to said cylinders for pushing said pistons down against the pressure of said spring means to place said coil spring in operation load-carrying position.

6. A vehicle having a body, a telescoping type of shock absorber mounted through resilient means at its upper end to said vehicle body, ground-engaging wheels, a structure for supporting said wheels, a resilient means forming the connection between the lower end of said shock absorber and said structure, a coil spring mounted around said shock absorber, a single cylinder mounted at the upper end of said shock absorber at one side of and secured to said coil spring, a piston for said cylinder attached to the upper center of said shock absorber, fluid pressure for operating said cylinder and moving it relatively to said shock absorber for moving said coil spring so that the end thereof opposite to said cylinder can be moved from a free position into load-carrying position with a preload applied to said coil spring, when said structure and said body are in their normal stationary unloaded relationship.

7. In a vehicle having a body, ground-engaging wheels, a structure for supporting said wheels, and a telescopic type of shock absorber with one end mounted to said vehicle body and its other end mounted to said structure, the combination therewith of: a coil spring mounted around said shock absorber; an annular bearing slidably mounted around said shock absorber with one end of said coil spring secured thereagainst; and means for moving said bearing a predetermined stroke relatively to said shock absorber to move said coil spring between an inoperative position where its opposite end is free and an operative load-carrying position where said opposite end is engaged and a pre-load applied between said body and said structure so that load is applied to said spring, said means comprising a cylinder mounted movably at an upper end of said shock absorber at one side of said spring and secured to said bearing, a piston for said cylinder rigidly connected to the upper center of said shock absorber, and fluid pressure means for operating said cylinder.

8. In a vehicle having a body, ground-engaging wheels, a structure for supporting said wheels, and a telescopic type of shock absorber with one end mounted to said vehicle body and its other end mounted to said structure, the combination therewith of: a coil spring mounted around said shock absorber; an annular bearing slidably mounted around said shock absorber with an upper end of said coil spring secured thereagainst; a cylinder mounted movably at an upper end of said shock absorber at one side of said spring and secured to said bearing; a piston for said cylinder secured to the upper center of said shock absorber; and fluid pressure means for operating said cylinder so as to move said bearing and the upper end of said coil spring relative to said shock absorber to apply a preload to said spring.

9. A vehicle having a body, a telescoping type of shock absorber mounted through resilient means at its upper end to said vehicle body, ground-engaging wheels, a structure for supporting said wheels, resilient means forming the connection between the lower end of said shock absorber and said structure, a coil spring mounted around said shock absorber, a single cylinder mounted at the upper end of said shock absorber at one side of and secured to said coil spring, a piston for said cylinder attached to the upper center of said shock absorber, and fluid pressure means for operating said cylinder and moving it relatively to said shock absorber for moving the top of said coil spring to vary the load-carrying function of said spring at a given spacing of the ends of said shock absorber.

10. In a vehicle having a body, a telescoping type of shock absorber with a first portion mounted through resilient means at its upper end to said vehicle body, ground-engaging wheels, a structure for supporting said wheels, and resilient means forming the connection between the lower end of a second portion of said shock absorber and said structure, the combination therewith of: a coil spring mounted around said shock absorber with the inner surfaces of the coils closely surrounding the shock absorber; an annular member closely surrounding said first portion of said shock absorber with an upper end of said coil spring secured thereto; means having its major portion laterally exterior of the spring and below the top of the shock absorber for moving said annular member relatively to said shock absorber to move the upper end of said spring and thereby apply a preload to said spring; and means rigidly connecting said moving means to said annular member for guiding the movement of said annular member in positive alignment with and along an axis parallel to the center line of said shock absorber, thereby preventing cocking and binding of said annular member.

11. The structure of claim 2, wherein said means for moving said annular member comprises a toggle having one end connected to said first portion of said shock absorber and its other end connected to said annular member, and remote control means operable from the driver's compartment in said body and connected to said toggle.

12. The structure of claim 7, wherein said fluid pressure means includes a fluid reservoir, a pump and a relief valve arrangement, and means operable from the driver's compartment of said body for controlling said cylinder and said arrangement.

13. The structure of claim 9, wherein remote control means is operable from the driver's compartment in said body for controlling said cylinder and fluid pressure means.

14. The structure of claim 10, wherein the means for moving said annular member is a cylinder and piston arrangement, a source of operating fluid including a conduit connected to said cylinder and piston arrangement, and means operable from the driver's compartment in said body for controlling the flow of said operating fluid in said conduit and relative movement of said cylinder and piston arrangement.

15. The structure of claim 14, in which the source of operating fluid includes a manually operable pump and relief valve arrangement.

16. The structure of claim 14, in which said cylinder is secured to and moves with one portion of said shock absorber and said piston moves with said annular member.

References Cited in the file of this patent

UNITED STATES PATENTS

| | | |
|---|---|---|
| 1,044,339 | Border | Nov. 12, 1912 |
| 2,314,505 | McIntyre | Mar. 23, 1943 |
| 2,441,629 | Hahn | May 18, 1948 |
| 2,518,733 | Walker | Aug. 15, 1950 |
| 2,592,391 | Butterfield | Apr. 8, 1952 |
| 2,733,058 | Reese | Jan. 31, 1956 |
| 2,746,764 | Davis | May 22, 1956 |

FOREIGN PATENTS

| | | |
|---|---|---|
| 612,843 | Germany | May 6, 1935 |